United States Patent [19]
Garrett et al.

[11] Patent Number: 5,384,663
[45] Date of Patent: Jan. 24, 1995

[54] ROTATABLE CRYSTAL POSITIONING APPARATUS

[75] Inventors: Mark H. Garrett, Michelbach-le-bas, France; Daniel Rytz, Bottmingen, Switzerland

[73] Assignee: Sandoz Ltd., Basel, Switzerland

[21] Appl. No.: 967,608

[22] Filed: Oct. 28, 1992

[30] Foreign Application Priority Data

Oct. 30, 1991 [GB] United Kingdom ............... 9123072

[51] Int. Cl.$^6$ .................. G02B 7/182; H05G 1/02
[52] U.S. Cl. ................... 359/896; 359/874; 359/876; 378/195
[58] Field of Search .............. 359/831, 871, 876, 881, 359/896, 832, 837, 873, 874; 378/79, 70, 71, 73, 80, 195, 203; 248/466, 479, 485; 356/244

[56] References Cited

U.S. PATENT DOCUMENTS

| | | | |
|---|---|---|---|
| 2,431,282 | 11/1943 | Speed | 125/35 |
| 3,126,478 | 3/1964 | Götz et al. | 250/526 |
| 4,771,446 | 9/1988 | Howe et al. | 378/73 |
| 4,773,739 | 9/1988 | Valley et al. | 359/300 |
| 4,788,702 | 11/1988 | Howe et al. | 378/73 |
| 5,023,477 | 6/1991 | Valley et al. | 307/425 |
| 5,075,573 | 12/1991 | Huignard et al. | 359/326 |

FOREIGN PATENT DOCUMENTS

| | | |
|---|---|---|
| 2022860 | 12/1979 | European Pat. Off. |
| 0398779 | 11/1990 | European Pat. Off. |
| 3103322 | 12/1981 | Germany |
| WO9113344 | 9/1991 | WIPO |

OTHER PUBLICATIONS

Derwent Abstracts for: WO 9113344 DE 3103322 EP 398779.
Search Report (France) dated 5 Oct. 93.

*Primary Examiner*—Loha Ben
*Assistant Examiner*—Darryl J. Collins
*Attorney, Agent, or Firm*—Robert S. Honor; Richard E. Vila; Andrew N. Parfomak

[57] ABSTRACT

A crystal holder for use with photorefractive crystals comprises a horizontal rotatable planar member on which is mounted a crystal, such that the axis of rotation of the planar member lies on a face of the crystal on which a beam of light impinges. In a preferred embodiment, the crystal may be moved such that the axis of rotation continues to lie on the face of the crystal over at least a substantial portion of the face. The crystal holders of this invention are useful, for example, in phase conjugate mirrors.

9 Claims, 3 Drawing Sheets

ROTATABLE CRYSTAL POSITIONING APPARATUS

This invention relates to a holder for photorefractive crystals.

Photorefractive crystals of materials such as barium titanate ($BaTiO_3$) or strontium-barium niobate ($Sr_{1-x}Ba_xNb_2O_6$) are widely used in various apparatus and instruments such as optical data networks, and optical neural networks for example, as phase conjugate mirrors. One of the difficulties encountered in the utilization of such crystals is the difficulty in positioning them appropriately with respect to an incident beam of light. The commonly-used crystal holders have the problem that any rotation thereof changes the point of incidence of the beam on the crystal. The parameters of the entire system are changed thereby. This can be overcome by using complex apparatus such as "X-Y tables", which can move crystals on two perpendicular axes. However, these are very expensive.

It has now been found that there can be made a crystal holder which substantially or completely overcomes all of the problems of the art and which permits the easy and accurate use of photorefractive crystals. There is therefore provided, according to the present invention, a crystal holder adapted to be used in applications involving the use of photorefractive crystals, comprising a horizontal rotatable planar member on which is mounted a crystal holding means which holds a crystal thereon such that the axis of rotation of the planar member lies on a face of the crystal which is incident to a beam of light impinging thereon.

The crystal is held on a rotatable planar member such that the axis of rotation of the planar member lies on a face of the crystal sample. By "rotatable planar member" is meant a member which comprises a horizontal planar area and which can be turned about a vertical axis. The turning may be continuous, such as may be achieved by the pivotal mounting of a part thereof, and it may pivot over any suitable angular distance up to a full revolution. Alternatively, the turning may be to a discrete, preset position, achieved for example by having a planar member with downwardly projecting prongs which fit into matching apertures in a carrying member such that the planar member is rigidly held therein, and providing in the carrying member other sets of apertures angularly disposed of each other such that the planar member may be lifted out and located in a new orientation in a new set of apertures.

The effect of the positioning of the axis of rotation is that the turning of the planar member has no effect on the point of incidence of the light. This is quite different from known crystal holders which clamp a crystal centrally on a planar member, with the result that the point of incidence moves as the planar member is rotated. It should be noted in this connection that the diameter of a beam of laser light, although small, is not totally negligible (typically of the order of a few tenths of a millimeter to a few millimeters), and although the incidence point of the central axis of the beam will not alter, those of the outer parts of the beam will change and there will inevitably be some distortion. This in not critical to the working of the invention and for practical purposes can be ignored.

The means by which the crystal is held in place may be any means known to the art. Typically, it is achieved by a clamping arrangement, preferably one in which some fixed part of the planar member acts as one jaw of a clamp ("the fixed jaw") and clamping action is exerted by a single rigid member ("the movable jaw") which is adapted to be reversibly moved towards the fixed jaw. The fixed jaw may, for example, be the planar surface on which the crystal rests, with clamping pressure applied in a vertical plane by a movable jaw on top of the crystal. This movement and clamping are performed by means which permit the crystal to be held firmly, yet without excessive pressure. The pressure is applied to the a-axis of the crystal so that ferroelectric domains are not mechanically induced into the crystal. Suitable means are, for example, spring-loaded screws. In one embodiment, the movable jaw is transparent such that the crystal may be more easily seen and therefore positioned properly more easily. This is especially valuable when clamping is in a vertical plane, with the movable jaw above the crystal. In another embodiment, the movable jaw is made of heat-conducting material, so that, in high power applications, it can act as a heat sink.

Alternatively the crystal may be clamped by means which exert clamping pressure in a generally horizontal plane rather than in a generally vertical plane. In a typical arrangement, the fixed jaw is a vertical surface bounding the planar surface on which the crystal sits and against which the crystal is clamped by means, for example, of a screw-actuated jaw.

The opposite sides of crystals which are to be subjected to clamping pressure are often not parallel. In such cases, provision may be made in the clamping arrangement to accomodate such crystals. The provisions will depend on the nature of the clamping arrangement, but are within the skill of the art. They include jaws which can be "skewed" slightly.

The area of the rotatable planar member on which the crystal rests is flat and is preferably polished. It is preferred that the planar member be metal such that it can act as a heat sink. The rotatable planar member on which the crystal rests may comprise a single unit, or it may be a separate and/or removable entity capable of rigid attachment to a rotatable entity. For example, the rotatable planar member may be a metal heat-conducting entity attached to a rotatable entity which is made of a ceramic or plastics material.

In one desirable embodiment, the rotatable planar member on which the crystal rests is a separate component from the rotatable member and is adapted to be fitted to a rotatable entity of a known apparatus by any convenient means. This brings the benefits of the invention to users of conventional equipment. In one embodiment, the planar member may be so equipped that the crystal may be moved towards and/or away from the axis of rotation such that the crystal may be more precisely positioned with respect to that axis. It is of course essential that such a member be able to be locked into any desired position such that no further movement is possible, once the desired position is achieved.

In a preferred embodiment, the crystal holder additionally comprises a crystal moving means whose purpose is to permit the crystal to be moved such that the axis of rotation lies on the face of the crystal over at least a substantial portion thereof. This movement is entirely separate from any precise positioning movement of the type hereinabove described and is an extremely useful embodiment. In essence, the crystal moving means moves the face of the crystal such that the axis of rotation of the planar member always lies on the face. This can be achieved by any convenient means, such as a simple slide arrangement which has the necessary lateral rigidity such that the axis of rotation will always lie in the plane of the face. The movement may be achieved by any convenient means, for example a screw of fine pitch such as that found on a micrometer. The movement may be achieved by any convenient means, for example, a manual or electro-mechanical mechanism. In some sophisticated applications, it is appropriate to use an electric motor drive or electromagnetic means, which can be computer controlled.

In a further embodiment of the invention, the crystal holder may be equipped with a cover which comprises one or several apertures through which a beam or beams of light may be shone. This is especially useful when using a crystal as a phase conjugate mirror for laser light. The cover mechanically protects the crystal and prevents extraneous reflections and refractions from leaving the apparatus—only the desired beam(s) enter(s) and leave(s) through the single aperture(s). The cover may have a transparent top made, for example, from a transparent polymeric material such as polycarbonate or polymethyl methacrylate, such that the crystal holder may be viewed. Alternatively, the top may be opaque. A cover made from a single piece of extruded aluminium is especially useful for protection, lack of corrosion and the ability to be anodized black (useful for optical applications).

One valuable feature of the invention is that crystals can be supplied mounted and ready for use in units which have aperture covers as hereinabove described and which can be immediately fitted on to readily-available instruments.

The invention is further described with reference to the drawings which depict preferred embodiments which, when equipped with suitable photorefractive crystals, can act as phase conjugate mirrors.

Figure 1:
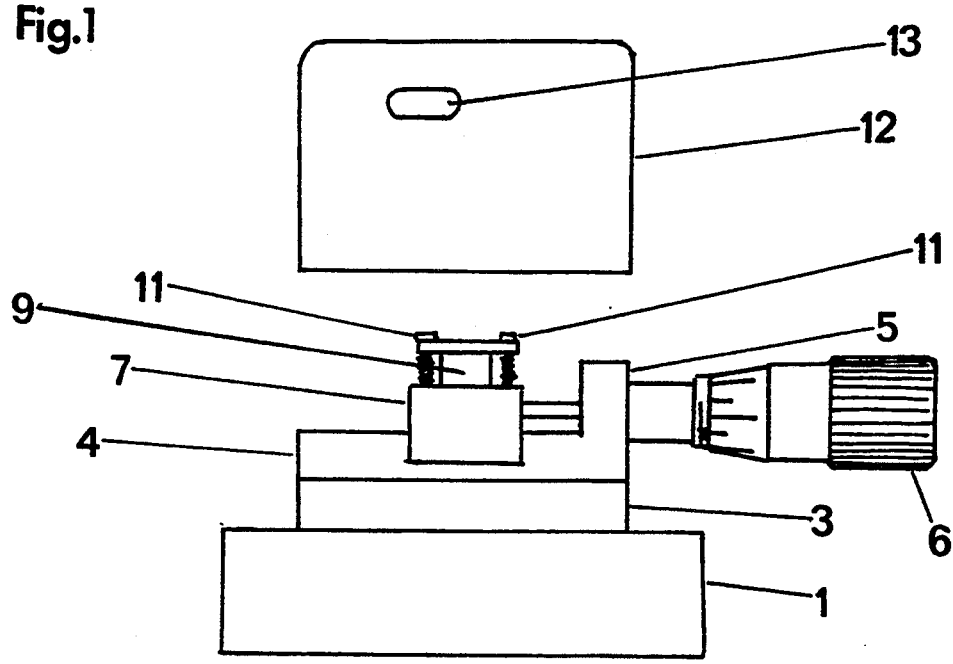
FIG. 1 is an elevational view of a crystal holder according to the invention.
Figure 2:
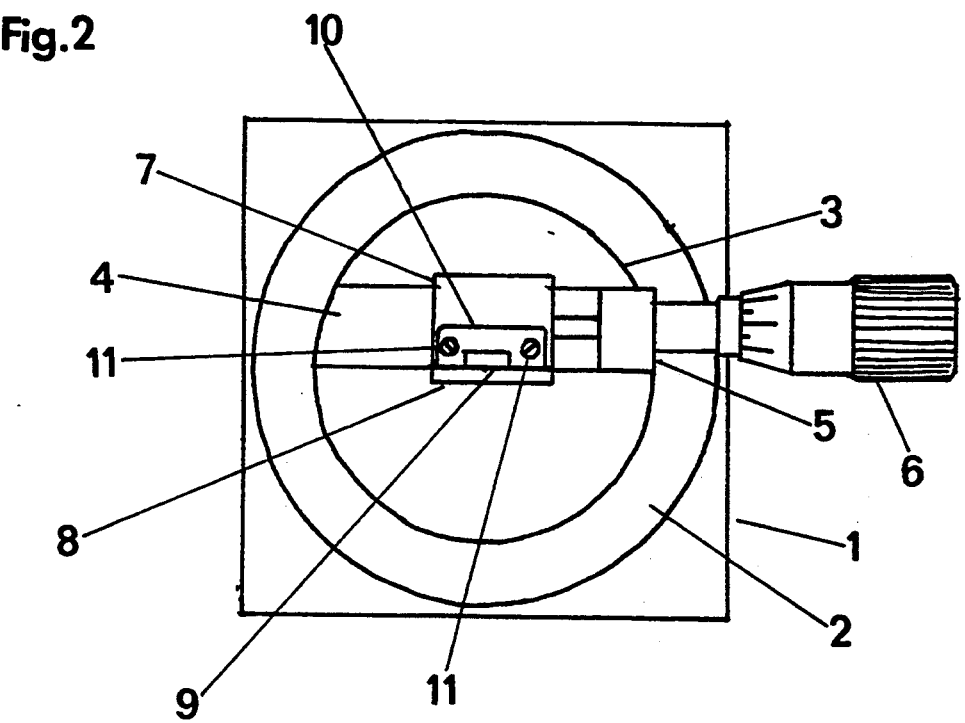
FIG. 2 is a plan view of the embodiment of FIG. 1.

In the embodiment depicted in FIGS. 1 and 2, a mounting plate (1), adapted to be mounted on a standard mounting post, has incorporated therein a turntable (2) which can be caused to rotate into any desired position about a vertical axis. Rigidly and coaxially affixed to this turntable is a disc (3). Mounted on this disc and extending across it is a straight metal rod of rectangular cross section (4), hereinafter referred to as "the track". The track is affixed such that the side nearer to the axis of rotation of the turntable either intersects the axis or lies very close thereto. At one end of the track there rises from the track perpendicularly with respect to the plane of the turntable a rectangular block (5) which is integral with the track and which is adapted to hold a micrometer screw (6). Slidably seated on the track is a crystal mounting block (7), this being rectangular in form and wider than the track and having formed therein a rectangular groove which matches closely the cross section of the track (4), such that the mounting block (7) may be seated-on the track and be capable of sliding along it, but with an acceptably small degree of movement transverse to the direction of slide. That transverse side of the mounting block (7) nearer to the micrometer screw is affixed thereto such that the turning of the micrometer screw causes the mounting block (7) to move along the track (4).

The upper surface of the mounting block (7) is generally planar, the plane being parallel to those of the turntable (2) and disc (3). There is raised at that edge of the block nearer to the axis of rotation a rectangular wall (8), this being positioned so that the face of a crystal (9) placed against it will lie on a line intersecting the axis of rotation. The crystal (9) is secured in place by means of a clamp, this comprising a rectangular jaw as of a rigid plastics material (10) fastened to the mounting block by means of screws (11) which cooperate with screw threads in the mounting block (7). The screwing down of these screws towards the mounting block will secure in place any crystal placed between rectangular jaw (10) and mounting block (7).

There is fitted over the track and block a cover (12), this being essentially a hollow aluminium cylinder, black anodized inside, open at one end and adapted to be a snug fit over the disc (3), and having the necessary cut-outs and clearances for any part mounted on the disc which protrudes beyond the circumference thereof. This cover is equipped with one or several apertures (13) which permit beams of light to enter and leave.

In use, as a phase conjugate mirror, the entire apparatus is fitted to a standard mounting post and the turntable turned such that the beam enters the aperture (13) of the cover (12) and strikes the crystal. The turntable is rotated until the desired angle of incidence is obtained and the crystal moved by means of the micrometer screw until a suitable incidence point is obtained on the crystal face.

Figure 3:
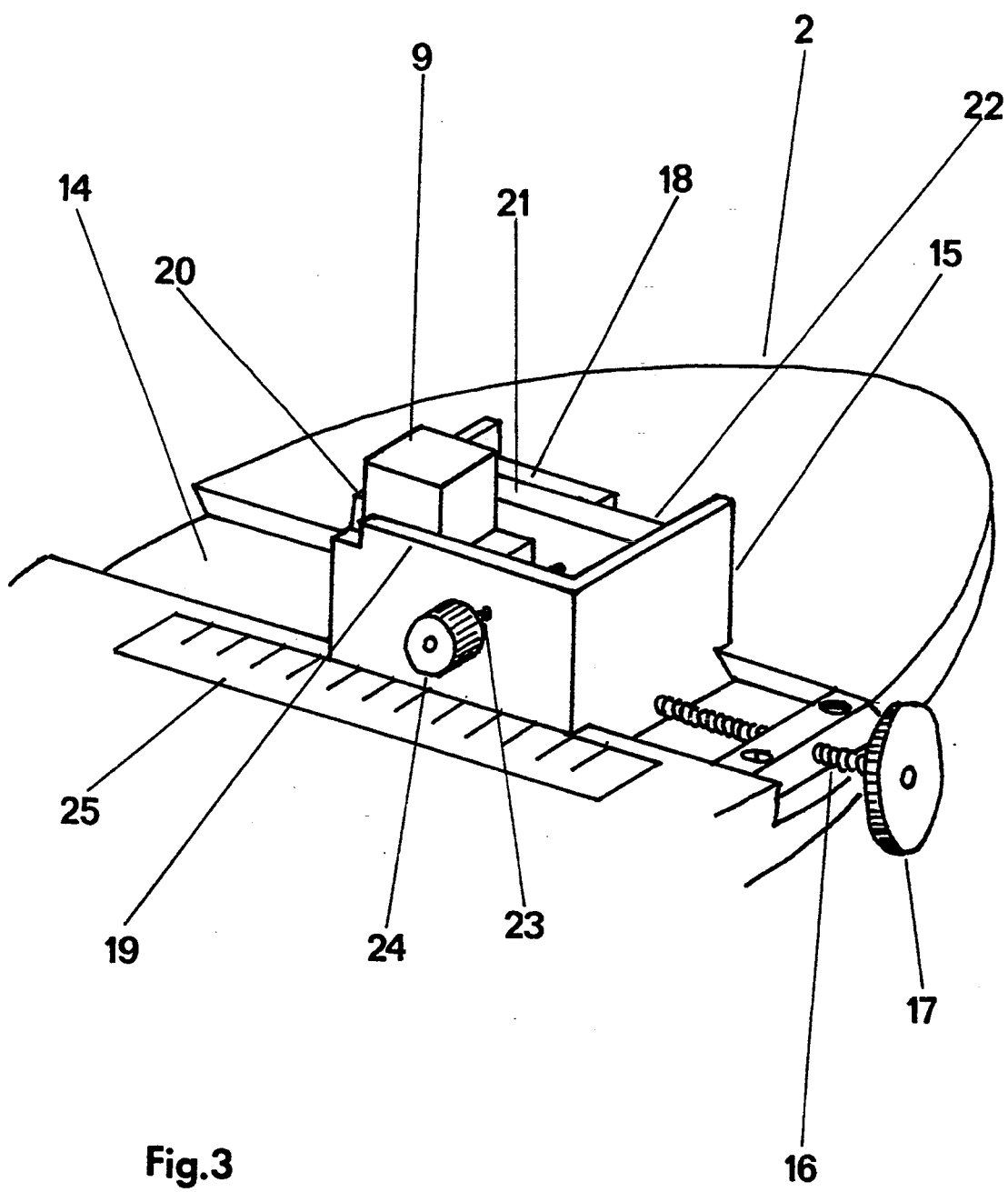
FIG. 3 is a perspective view of another embodiment of the invention.

In the embodiment shown in FIG. 3, a turntable (2) has formed therein a groove (14) of dovetail cross-section. Within this groove can move a crystal holder (15) whose lower part conforms to the shape of, and is slidably movable within, the groove (14), movement being effected by a screw thread (16) operated by a wheel (17).

The upper part of the crystal holder (15) comprises a rectangular planar surface (18) on which the crystal (9) rests. This surface (18) is bounded by two vertical walls (19, 20) which are positioned on adjacent edges of the surface, the inner face of wall (19) lying in the plane of the axis of rotation and the wall (20) being positioned at that edge remote from the wheel (17). Together these walls (19, 20) define a crystal-holding area. The device is configured such that rotation of the wheel (17) causes the inner face of wall (19) (and therefore the face of any crystal held against it) to move through the axis of rotation.

The crystal is clamped in place on the crystal holder (15) by clamping means, comprising a movable jaw (21) which is slidably movable in a rectangular groove (22) in the crystal holder (15) by means of a screw thread (23) operated by a knob (24). The rotation of the knob causes the moveable jaw (21) to press the crystal (9) against the wall (19) and thus hold it in place.

A scale (25) mounted on the turntable allows the translations movement of the crystal holder to be measured.

Figure 4:
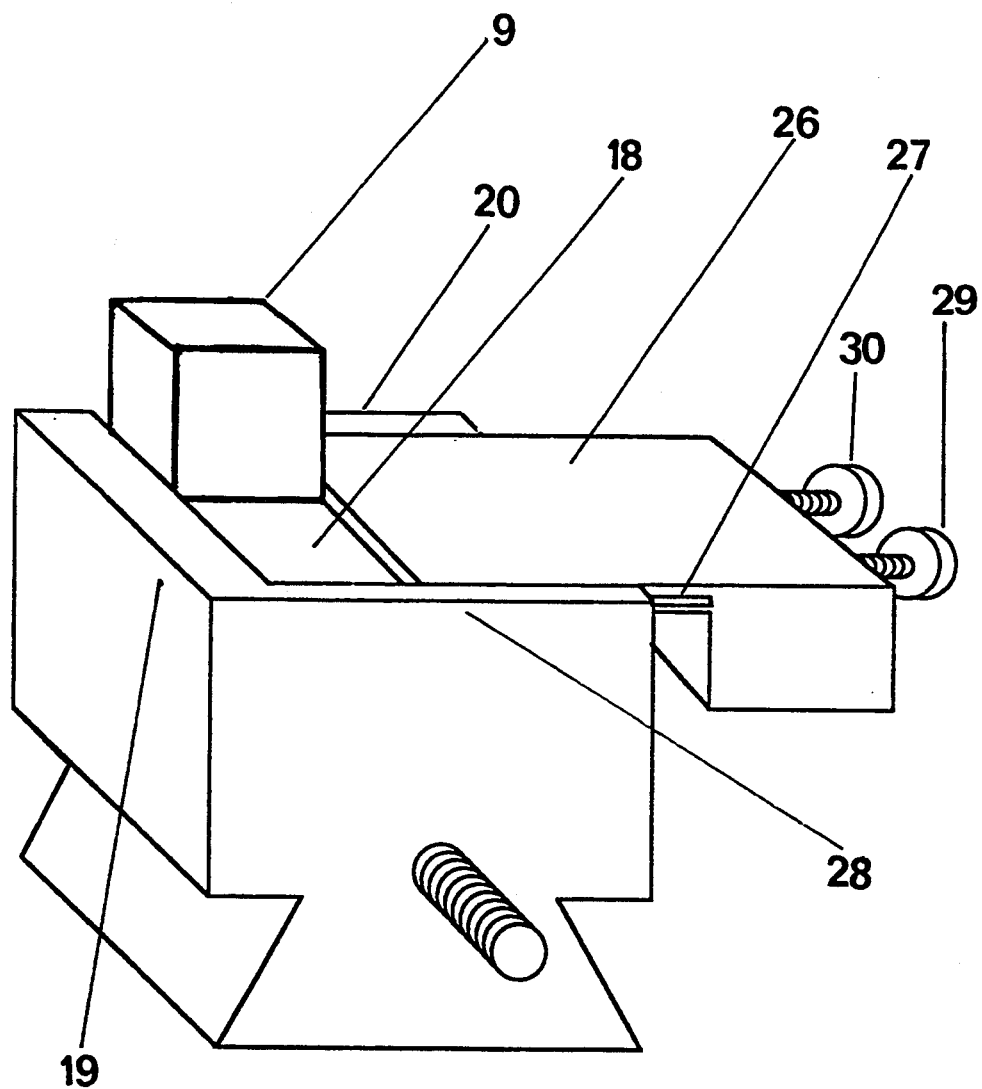
FIG. 4 is a perspective view of a variation on the embodiment depicted in FIG. 3.

In FIG. 4 is depicted a crystal holder which may be used in a turntable of the type depicted in FIG. 3, and which is useful for crystals which may not have parallel sides.

The crystal holder has the same basic configuration as that depicted in FIG. 3. Clamping in this case is provided by a movable jaw (26) which is equipped with transversely-extending, rectangular cross section ridges (only one (27) shown) which are a slidable fit in grooves (not shown) of matching profile formed in the inner faces of wall (20, 28) The movable jaw (26) is caused to move to clamp a crystal (9) by means of two screws (29, 30). The dimensions and fit of the ridges (27) and grooves are such that the movable jaw (26) may be slightly skewed. This allows the firm gripping of a crystal which has sides which are not exactly parallel.

The skilled person will readily appreciate that there are many variations which can be made to this apparatus but which remain within the scope of the invention. For example, adjustment of the position of the mounting block (7) may be remotely controlled by means of an electric motor. As hereinabove mentioned, there need not be a turntable capable of continuous 360° rotation, but several series of mounting holes which permit a mounting block suitably equipped with matching downwardly extending projections to be changed between discrete positions. Many other variations of track, mounting block and clamp are possible, all of them being within the ambit of this invention.

We claim:

1. A crystal holder apparatus adapted for mounting a crystal having at least one generally planar face which apparatus comprises:
   a horizontal rotatable turntable rotatable about an axis of rotation;
   a crystal holding means which includes:
      a linear track mounted upon the horizontal rotatable turntable such that one side of the track is approximately coincident with the axis of rotation, and
      a crystal mounting block adapted to removably hold the crystal such that the at least one generally planar face thereof is coincident with the axis of rotation and the crystal mounting block is slidably mounted upon the linear track such that when the crystal mounting block is moved along the linear track the at least one generally planar face of the crystal remains coincident with the axis of rotation of the horizontal rotatable turntable.

2. A crystal holder apparatus according to claim 1 which further comprises:
   a rotatable screw adapted to move the crystal mounting block along the linear track.

3. A crystal holder apparatus according to claim 1 wherein the crystal mounting block further comprises:
   a clamping means comprising a moveable jaw for demountably holding the crystal.

4. A crystal holder apparatus according to claim 1 wherein the crystal mounting block further comprises:
   a clamping means which includes a rigid jaw and an opposably moveable jaw for demountably holding the crystal 5. A crystal holder apparatus according to claim 4 wherein the rigid jaw of the clamping means is an integral portion of the crystal mounting block.

6. A crystal holder apparatus according to claim 1 wherein the crystal mounting block further comprises:
   a vertical wall along at least one edge of the crystal mounting block having an inner wall face adapted to contact the at least one generally planar surface of the crystal wherein the inner wall face coincides with the axis of rotation.

7. A crystal holder apparatus according to claim 1 which further comprises:
   a cover.

8. A crystal holder apparatus according to claim 1 which further comprises:
   a mounting plate.

9. A crystal holder apparatus for photorefractive crystals according to claim 1.

* * * * *